United States Patent

Anderson et al.

(10) Patent No.: US 6,370,752 B1
(45) Date of Patent: Apr. 16, 2002

(54) METHOD FOR REPOSITIONING OR REPAIRING HOLES

(75) Inventors: William C. Anderson, Springdale; Dewey D. Dunkman; Gerald R. Geverdt, both of Cincinnati, all of OH (US); Ronald D. Stapperfenne, Edgewood, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/556,182

(22) Filed: Apr. 21, 2000

(51) Int. Cl.[7] .................................................. B23P 19/04
(52) U.S. Cl. ................. 29/402.11; 29/402.09; 29/889.1; 29/522.1
(58) Field of Search .................. 29/889.21, 402.09, 29/889.1, 522.1, 402.11, 402.06, 524.1; 408/84, 87; 411/500, 501, 506, 507; 403/274, 278, 282

(56) References Cited

U.S. PATENT DOCUMENTS

| 222,321 | A | * | 12/1879 | Smith ........................... 408/87 |
| 2,010,569 | A | | 8/1935 | Sitzler .......................... 29/148 |
| 3,487,530 | A | | 1/1970 | Ely ............................... 29/402 |
| 3,519,503 | A | | 7/1970 | Moore et al. ............... 148/11.5 |
| 3,522,648 | A | | 8/1970 | Weber .......................... 29/522 |
| 3,626,568 | A | | 12/1971 | Silverstein et al. ..... 29/156.8 H |
| 3,653,243 | A | | 4/1972 | Ramseier ...................... 72/122 |
| 3,878,599 | A | * | 4/1975 | Ladouceur et al. |
| 4,164,807 | A | | 8/1979 | King ............................ 29/523 |
| 4,221,041 | A | * | 9/1980 | Hufnagl .................. 403/274 X |
| 4,953,777 | A | | 9/1990 | Griffith et al. .............. 228/119 |
| 4,984,347 | A | * | 1/1991 | Cox ..................... 29/402.06 O |
| 4,985,979 | A | * | 1/1991 | Speakman ............. 29/524.1 O |
| 5,077,882 | A | * | 1/1992 | Adams ................. 29/402.11 X |
| 5,111,570 | A | | 5/1992 | Baumgarten et al. .... 29/402.13 |
| 5,469,617 | A | | 11/1995 | Thomas et al. .......... 29/889.21 |
| 5,651,172 | A | * | 7/1997 | Auriol et al. .......... 29/524.1 X |
| 5,975,406 | A | | 11/1999 | Mahoney et al. ........ 228/112.1 |

FOREIGN PATENT DOCUMENTS

| SU | 1532177 A | * | 3/1988 | .............. 29/402.11 |

OTHER PUBLICATIONS

Bracker, "Radial–Riveters Modular Building Block Concept," pp. 1–2, 8–9 and 19.

* cited by examiner

Primary Examiner—S. Thomas Hughes
Assistant Examiner—Steven A Blount
(74) Attorney, Agent, or Firm—V. Ramaswamy; Smith, Guttag, Hasec & Nesbitt LTD

(57) ABSTRACT

A method for repositioning or repairing holes in metal substrates such as metal components used in jet engines and the like. The hole to be repositioned or repaired is enlarged and a recess is formed at each end of the enlarged hole. A deformable metal insert is then inserted within the enlarged hole and then subjected to physical forces so as to cause it to deform and frictionally engage the walls of the recesses and the enlarged hole so that the insert becomes axially fixed therein. A new, repositioned hole can then be formed in the fixed insert that extends completely therethrough.

17 Claims, 3 Drawing Sheets

METHOD FOR REPOSITIONING OR REPAIRING HOLES

BACKGROUND OF THE INVENTION

The present invention relates generally to method for repositioning or repairing holes in metal substrates such as metal components used in jet engines and the like, and more particularly to method for repositioning or repairing holes such metal substrates using a physically deformable metal insert.

Many metal components such as nozzle supports and rotor or compressor disks used in jet engines require holes to be drilled in the component so that other components can bolted on or otherwise attached thereto. For example, U.S. Pat. No. 4,953,777 (Griffith et al), issued Sep. 4, 1990, shows fan rotor assemblies used in jet engines where the fan blades are mounted on a rotatable disk. The fan blades can have one or more tangs by which the blades are attached in spaced relation around the periphery of the disk. In one such embodiment, the blade has three tangs, each having a hole therein aligned along the same axis. The blade is mounted to the disk, the center tang entering a peripheral annular space of the disk, with the two outer tangs extending along the outside surface of each side of the disk which also has holes that line up with the holes of the tangs. A retaining pin is then passed through the holes in the disk and the aligned holes of the tangs to attach each of the blades to the periphery of the disk.

Another example of an engine component with drilled holes is illustrated in U.S. Pat. No. 5,111,570 (Baumgarten et al), issued May 12, 1992. In FIG. 1 of this patent is shown an integrally bladed compressor disk 1 having a plurality of bolt holes 2 located on spaced arrangement around the circumference of flange 3. Other engine components are joined to this compressor disk by bolting these components onto flange 3 using bolt holes 2.

When holes are drilled or otherwise formed in such metal components, one or more of the holes can mislocated, misaligned, misdrilled, or damaged during assembly of the components or during use. For example, the holes formed in these components can be subjected to stress during use and wear away or deform. This can lead to removal, discarding or scrapping of the component where the mislocated, misaligned, misdrilled, or damaged hole is located. This can be very expensive, especially in the case of certain components such as rotor or compressor disks used in jet engines. For example, in the case of integrally bladed rotors, substantial expense has been incurred prior to joining the components to each other. Accordingly, as the value of the individual assembly increases, the margin of error in machining and joining these components together becomes even more critical.

In the past, such mislocated, misaligned, misdrilled, or damaged holes were sometimes repaired by welding. However, welding and subsequent heat treatment to reposition or repair the hole can cause undesired distortion of the component, as well as a reduction the metal fatigue capability of a component that can be subjected to high temperatures and stresses during use, as is typically the case of the jet engine components. In the case of certain metal alloys such as high volume fraction gamma prime nickel-base superalloys, components made from such alloys are not weldable due to strain age cracking.

Another method for repositioning or repairing such holes is described in U.S. Pat. No. 4,953,777. In the method of this patent, as particularly shown in FIGS. 2A–C and 3, hole 19 to be repaired is machined to a diameter sufficient to remove the damaged portion and to provide a new enlarged hole with a smooth finish. A metal bushing 20 having a composition compatible with the metal component being repaired is then inserted into this enlarged hole 19. The outer diameter of bushing 19 is machined to provide a close fit with the enlarged hole 19. Following insertion of bushing 20 into the enlarged hole 19, metal mandrel 21 is inserted into the bushing opening and the resulting assembly heated to cause diffusion bonding of bushing to the component 17. The assembly is then cooled and mandrel 21 is removed to provide the new hole formed by the opening in bushing 20. Again, like welding, diffusion bonding of the bushing according to this patent can cause undesired distortion of the component.

A variation of the method involved in U.S. Pat. No. 4,953,777 is to use a threaded or flanged bushing to reposition or repair the hole. In this situation, the threaded or flanged bushing is held within the enlarged hole by frictional forces. However, the use of threaded or flanged bushing may not be possible those situations where the hole to be repositioned or repaired is relatively small in diameter, where the area where the hole to be repositioned or repaired is relatively small or both. Also, threaded or flanged bushings are frequently held in place by green tack welds that have a tendency to crack over time and allow the bushing to migrate axially within the hole.

Another method for repositioning or repairing such holes is described in U.S. Pat. No. 5,111,570. In the method of this patent, as particularly shown in FIGS. 2–4, an enlarged hole indicated by 5 is formed such as by drilling in flange 3. Repair plug, 6 is positioned in enlarged hole 5 and then a forge joining pressure is applied from both ends of the plug, such by upper and lower punches 9 and 10 that are shaped and positioned to promote uniform heating and deformation of plug 6. While this force is applied by punches 9 and 10, the interface between plug 6 and the wall of enlarged hole 5 is locally heated. After the forge joining step, excess protrusion material 11 located on both sides of flange 3 can be machined away, leaving, a smooth flange surface that can be redrilled to provide a new hole 13 of selected position and diameter as shown in FIG. 7. Again, like welding and diffusion bonding, heating of the plug can cause undesired distortion of the component. In addition, like a threaded or flanged bushing, plug 6 can be subject to axial movement within enlarged hole 5 over time after the removal of the excess material 11.

Accordingly, it would desirable, therefore, to provide a method for repositioning or repairing mislocated, misaligned, misdrilled, or damaged holes in metal components that can be achieved without the use of an insert other than a threaded or flanged bushing, does not require heating of the component or insert used in the repositioning or repair of the hole, and which avoids or minimizes axial migration of the insert used to reposition or repair the hole.

SUMMARY OF THE INVENTION

The present invention relates to a method for repositioning or repairing a hole in a metal substrate having a first and second surface where the hole extends through the metal substrate from the first surface to the second surface of the substrate. In this method, the diameter of the hole is enlarged through the metal substrate from the first to the second surface to form an enlarged hole. A first recess having a wall with at least a portion of its diameter larger than the diameter of the enlarged hole is formed in one surface of the metal substrate at one end of the enlarged bole. A second recess having a wall with at least a portion of its diameter larger than the diameter of the enlarged hole is formed in the other surface of the metal substrate at the other end of the enlarged hole. A physically deformable metal insert having a head portion and body portion is provided and is inserted through one recess at one end of the enlarged hole so that the body portion extends at least partially within the enlarged hole. The head portion of the insert has an end with a diameter larger than the diameter of the enlarged hole, and is sized and configured so as to be capable of frictionally engaging the wall of one of the recesses. The body portion of the insert has an end, a diameter sized to permit it to be inserted at least partially within the enlarged hole and a length such that the end of the body portion is capable of extending at least to the other recess. After insertion, the head and body portions of the insert are then subjected to physical forces so as to cause the head portion of the insert to be deformed and frictionally engage the wall of the one recess, so as to cause the body portion of the insert to be deformed and frictionally engage the enlarged hole and so as to cause the end of the body portion to be deformed and frictionally engage the wall of the other recess so that insert becomes substantially axially fixed within the enlarged hole. A new, repositioned or repaired hole having a diameter smaller than that of the enlarged hole can then be formed in the fixed insert that extends axially therethrough from the end of the head portion to the end of the body portion.

The method of the present allows mislocated, misaligned, misdrilled, or damaged holes in the metal substrate to be repaired or repositioned without the use of heat treatment that can cause distortion or degradation of metal substrate. The use of the deformable metal insert having the head portion with a diameter sized to frictionally engage the wall of one of the recesses formed in one surface of the metal substrate, along with the end of the body portion of the insert that is capable of being deformed to frictionally engage the wall of the other recess formed in the other surface of the substrate, allows the insert to be substantially axially fixed within the enlarged hole. As a result, the insert tends not to migrate axially within the enlarged hole, even over time.

DETAILED DESCRIPTION OF THE INVENTION

Figure 1:
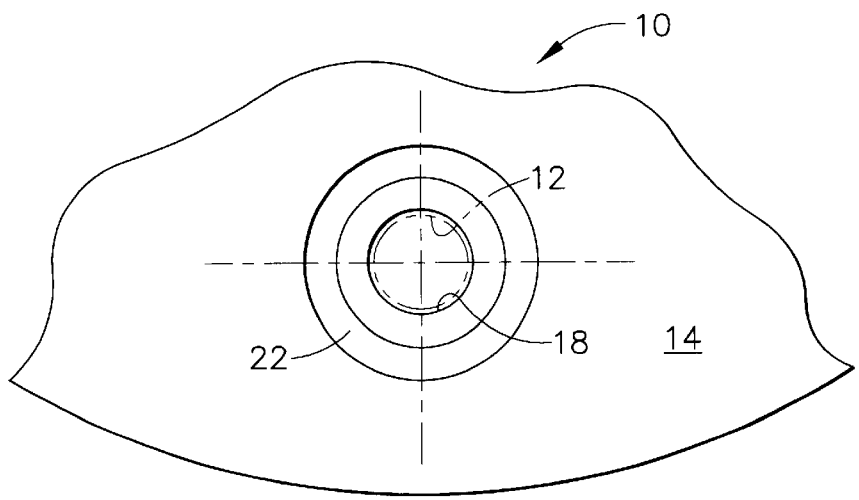
FIG. 1 is a partial broken top plan view of a metal substrate with the hole to be repositioned or repaired having been enlarged by an exemplary embodiment of the method of the present invention.

Referring to the drawings, FIG. 1 shows a portion of a metal substrate indicated by 10 from a metal component such as a nozzle support, or a rotor or compressor disk, fastener attachments, or the like that has a mislocated, misaligned, misdrilled, or damaged hole 12 requiring repair or repositioning and a first surface indicated by 14. As shown in FIG. 1, hole 12 that is to be repaired or repositioned has already been enlarged to form an enlarged hole 18 in the metal substrate by drilling, boring or similar methods known to those skilled in the art. While the hole that has been enlarged to form enlarged hole 18 has a circular shape so as to be cylindrical in configuration, the method of the present invention can also be used to repair or reposition holes having other configurations, including those where the shape of the hole is oval, elliptical, rounded rectangular, TV screen shaped multiple lobes or the like.

Figure 2:
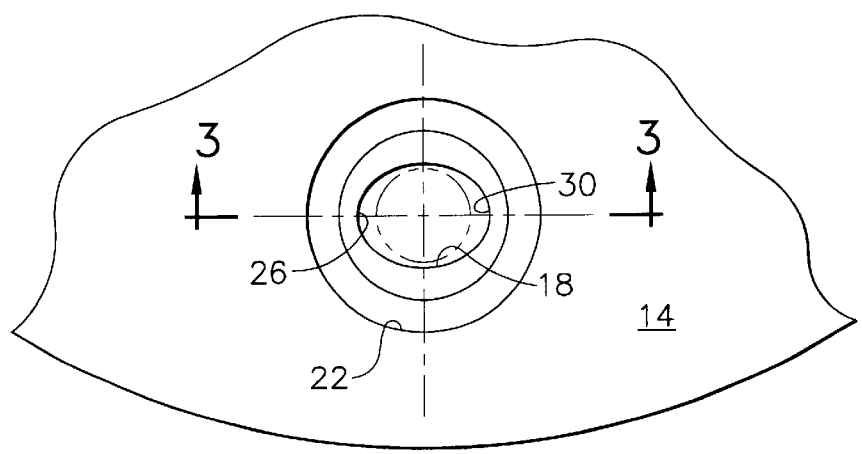
FIG. 2 is the partial broken top plan view of the metal substrate FIG. 1 after forming locking portions in the enlarged hole.
Figure 3:
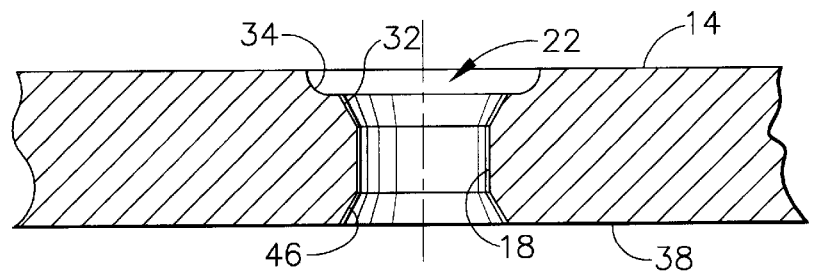
FIG. 3 is a side sectional view taken along line 3—3 of FIG. 2.

As also shown in FIG. 1, a recess 22 is formed in surface 14 at one end of hole 18. While recess 22 is typically formed after enlarged hole 18 is formed, the particular order of formation is not critical. As shown in FIG. 2, enlarged hole 18 is elongated across one axis, typically by milling hole 18, so that hole 18 to form a pair of opposed, typically ear-shaped locking portions 26 and 30. These locking portions 26 and 30 extend axially typically from one end of enlarged hole 18 to the other end of enlarged hole 18. As shown in FIG. 3, recess 22 comprises a countersink 32 that is connected at one end of enlarged hole 18 and counterbore 34 connected at one end of countersink 32 that extends to surface 14 of metal substrate 12. The purpose of counterbore 34 is typically to receive the head of the fastener such as a bolt or pin that goes into hole 12 and to allow the head of the fastener to lies flush with or below surface 14. Accordingly, the formation of counterbore can be optional in the method of the present invention.

As shown in FIG. 3, the diameter of the wall of countersink 32 tapers inwardly in the direction away from surface 14 and counterbore 34 and towards the end of hole 18 to which it is connected so that the diameter of the wall of countersink 32 is larger at the end closer to surface 14 and smaller at the end connected to hole 18. As also shown in FIG. 3, substrate 10 has another (second) surface indicated by 38 that has formed therein a recess in the form of countersink 46 that is connected at the other end of hole 18. As also shown in FIG. 3 and like countersink 32, the diameter of the wall of countersink 46 tapers inwardly in the direction away from surface 38 and towards the other end of hole 18 to which it is connected so that the diameter of the wall of countersink 46 is larger at the end closer to surface 38 and smaller at the end of hole 18. While countersinks 32 and 46 are shown in FIG. 3 as being of similar configuration and diameter, they can also be of different configuration and diameter without departing from the method of the present invention.

Figure 4:
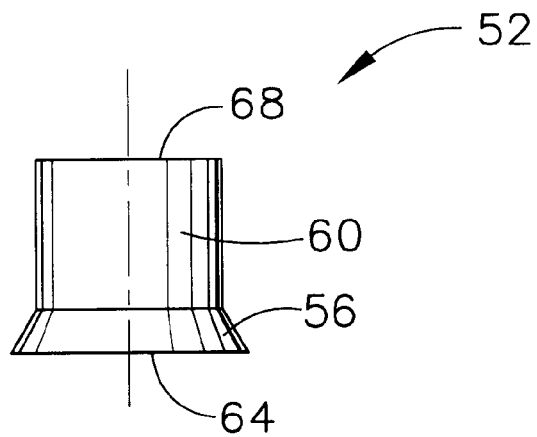
FIG. 4 is a side view of the deformable insert
Figure 5:
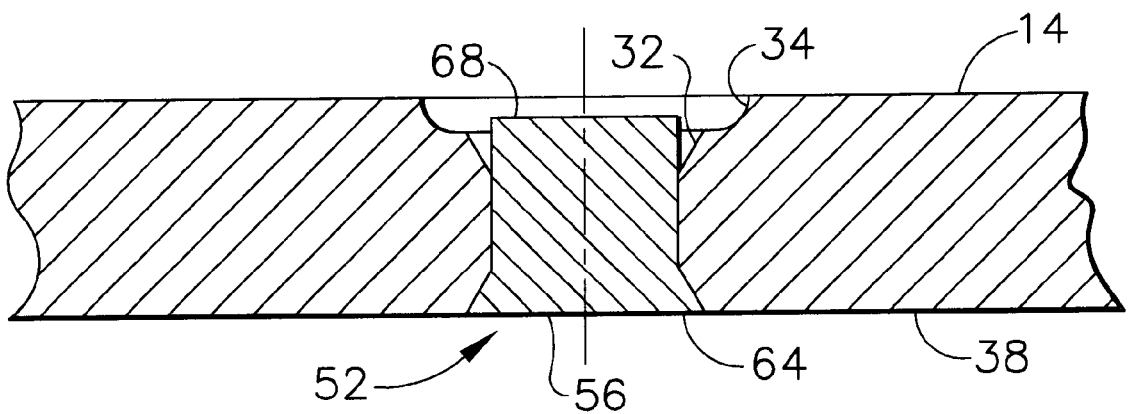
FIG. 5 is the side sectional view of FIG. 3 after the deformable metal insert has been inserted into the enlarged hole.

FIG. 4 shows an insert in the form of a rivet 52 made from a physically deformable metal, such as a nickel-based metal like Inco-600, which, as shown in FIG, 5, is inserted through countersink 46 and within hole 18. As shown in FIGS. 4 and 5, rivet 52 has a head portion 56 and a body portion 60. Head portion 56 has an end indicated by 64 with a diameter larger than the diameter of at least a portion of, and typically most of, the diameter of the wall of countersink 46 so that rivet 52 cannot be inserted completely through hole 18. As also shown in FIGS. 4 and 5, head portion 56 has a tapered, frustoconical configuration that is typically sized to be of the same or similar configuration as countersink 46 so that it fits snug against the wall of countersink 46 when rivet 52 is inserted. As also shown in FIGS. 4 and 5, body portion 60 has a cylindrical configuration that is typically sized to be of the same or similar diameter as hole 18 so that body portion 60 extends at least partially within, and preferably completely through, hole 18, when the rivet is inserted. As shown in FIG. 5, body portion 60 has sufficient length so that its end indicated by 68 extends beyond the end of enlarge hole 18 and into countersink 32 of recess 22.

Figure 6:
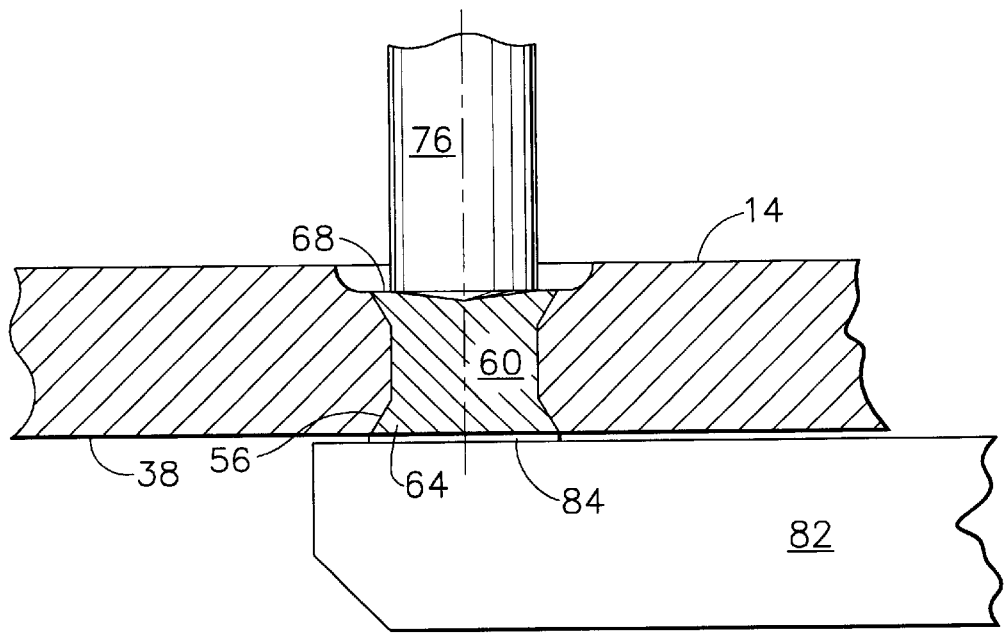
FIG. 6 is the side sectional view of FIG. 5 showing the physical forces being applied to the insert after insertion in the enlarged hole.

As shown in FIG. 6, physical forces are then applied to head and body portions 56 and 60 of inserted rivet to cause the head and body portions to be deformed and engage the walls of countersinks 32 and 46 and hole 18. These physical forces can be in the form a tool head or rivet set indicated by 76 that is part of, for example, a Bracker RN 281 radial-riveter that imparts radial forming forces through tool head 76, and an anvil or support indicated by 82 with a golf tee shaped insert made of a hard material such as tungsten carbide fits within a recess in support 82 and provides a cylindrical protrusion indicated by 84 that abuts head portion 56 of rivet 52. See U.S. Pat. No. 3,653,243 (Ramseier), issued Apr. 4, 1972 (herein incorporated by reference) which discloses such radial-riveters. Other suitable methods for deforming rivet 52 include the use of the combination of a conventional impact riveter or rivet gun and blocking bar, as well as other forms mechanical squeezing.

Tool head 76 preferably moves not only downwardly against end 68 of body portion 60 to apply the deforming forces, but also in series of overlapping orbital paths substantially parallel to the surface 14 of substrate 10 and substantially perpendicular to the longitudinal axis of body portion 60 so as to knead end 68 of body portion 60 outwardly, inwardly, in an overlapping fashion and generally towards the opposite surface 38 of the substrate. As a result, end 68 of body portion 60 deforms and frictionally engages the wall of countersink 36 closest the end of hole 18. In a preferred series of overlapping orbital paths referred to as "radial forming", the movement of tool head 76 forms a rosette pattern (typically an eleven-sided rosette pattern) that ensures uniform and consistent deformation of end 68 of body portion 60.

As tool head 76 applies deforming forces to end 68 of body portion 60 in the direction towards opposite surface 38 of substrate 10, protrusion 84 on support 82 resists the axial movement of body portion, 60 of rivet 52 within enlarged hole 18 and thus applies deforming forces to end 64 of head portion 56. As a result, head portion 56 deforms and frictionally engages the wall of countersink 46. The combined deforming forces created by the movement of tool head 76 and the resistance of protrusion 84 on support 82 also cause body portion 60 within enlarged hole 18 to also deform into and frictionally engage locking portions 26 and 30 of hole 18. In the absence of locking portions 26 and 30, rivet 52 can have a tendency to route within enlarged hole 18 as tool head 76 moves in the series of overlapping orbital paths substantially parallel to surface 14 of substrate 10 (and substantially perpendicular to the longitudinal axis of body portion 60) so as to apply the deforming forces to end 68 of body portion 60. However, as the body portion 60 within enlarged hole 18 is deformed into and frictionally engages locking portions 26 and 30, the body portion 60 of rivet 52 is less able to rotate within hole 18. As body portion 60 frictionally engages locking portions 26 and 30, as well as the remaining wall of enlarged hole 18, and especially because of the deformation and frictional engagement of head portion 56 with the wall of countersink 46, as well as end 68 of body portion 60 with the wall of countersink 32, rivet 52 becomes substantially axially fixed within hole 18. Indeed, the deformed and fixed rivet 52 tends not to migrate axially within hole 18 even over time as substrate 10 is subjected to stresses normally encountered during use.

Figure 7:
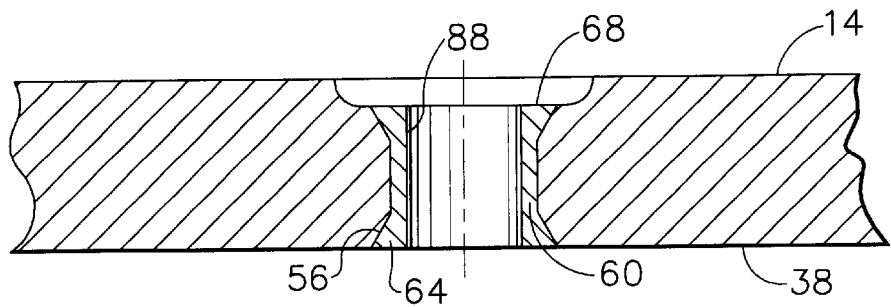
FIG. 7 is the side sectional view of FIG. 6 showing the insert fixed within the enlarged hole, as well as the new repositioned hole formed in the fixed insert.

As shown in FIG. 7, a new repositioned hole 88 of circular shape and cylindrical configuration is formed in fixed rivet 52. Hole 88 has diameter smaller than that of enlarged hole 18 and extends axially from end 64 of head portion 56 to end 68 of body portion 60. In forming hole 88 such as by drilling through fixed rivet 52, it can be desirable to use a support, such as a backing plate, preferably positioned against the deformed head portion 56 while hole 88 is formed through end portion 68 of body portion 60. Use of the support or backing plate restricts and resists axial movement of the fixed rivet 52 so that it does not become dislodged from hole 18, or possibly stretch or become distorted. It can also be desirable to initially drill a hole smaller in diameter than that of hole 88 (again preferably using a support or backing plate) to further minimize the tendency of fixed rivet 52 to be axially dislodged, stretched or distorted when larger diameter hole 88 is finally formed.

As also shown in FIGS. 6 and 7, end 64 of head portion 56 is preferably at or below the surface 38 of substrate 10, while end 68 of body portion 60 can be at or below surface 14 of substrate 10. This can be achieved either by removing the excess portions of ends 64 or 68 after insert 52 has been fixed within hole 18, or more typically by applying sufficient force for a sufficient period of time through the combined movement of tool head 76 and the resistance of support 82, especially so that end 64 is deformed sufficiently so as to be at least flush with surface 38 of substrate 10.

While specific embodiments of the method of the present invention have been described, it will be apparent to those skilled in the art that various modifications thereto can be made without departing from the spirit and scope of the present invention as defined in the appended claims.

What is claimed is:

1. A method for repositioning or repairing a hole in a metal substrate having a first and second surface wherein the hole extends through the substrate from the first surface to the second surface of the substrate, the method comprising the steps of:

(a) enlarging the diameter of the hole to form an enlarged hole through the substrate from the first to the second surface;

(b) forming in the first surface a first recess at one end of the enlarged hole, the first recess having a wall with at least a portion of its diameter larger than the diameter of the enlarged hole;

(c) forming in the second surface a second recess at the other end of the enlarged hole, the second recess having, a wall with at least a portion of its diameter larger than the diameter of the enlarged hole;

(d) providing a physically deformable metal insert having a head portion and body portion, the head portion having an end with a diameter larger than the diameter of the enlarged hole, and being sized and configured so as to be capable of frictionally engaging the wall of one of the recesses, the body portion having an end, a diameter sized to permit the body portion to be inserted at least partially within the enlarged hole and a length, such that the end of the body portion is capable of extending at least to the other recess;

(e) inserting the insert through the one recess so that the body portion extends at least partially within the enlarged hole;

(f) after insertion, subjecting the head and body portions of the insert to physical deforming forces so as to cause the head portion to be deformed and frictionally engage the wall of the one recess, so as to cause the body portion to be deformed and frictionally engage the enlarged hole and so as to cause the end of the body portion to be deformed and frictionally engage the wall of the other recess, so that the insert becomes substantially axially fixed within the enlarged hole.

2. The method of claim 1 which comprises the further step (g) of forming another hole having, a diameter smaller than that of the enlarged hole in the fixed insert that extends axially therethrough from the end of the head portion to the end of the body portion.

3. The method of claim 2 wherein the enlarged hole has a cylindrical configuration.

4. The method of claim 3 wherein the diameter of the wall of the first recess tapers inwardly in the direction away from the first surface of the substrate and towards one end of the enlarged hole and wherein the diameter of the wall of the second recess tapers inwardly in the direction away from the second surface of the substrate and towards the other end of the enlarged hole.

5. The method of claim 4 wherein the enlarged hole has formed therein a pair of opposed locking portions that extend axially from one end of the enlarged hole to the other end thereof, and wherein the body portion of the insert within the enlarged holed is deformed during step (f) into and frictionally engages the locking portions so that the body portion is less able to rotate within the enlarged hole.

6. The method of claim 4 wherein the head portion of the insert has a tapered configuration sized to be similar in configuration to that of the recess through which the insert is inserted.

7. The method of claim 6 wherein the head portion of the insert has a frustoconical configuration and wherein the body portion of the insert has a cylindrical configurations.

8. The method of claim 2 wherein the body portion of the insert has sufficient length such that the end of the body portion extends beyond one end of the enlarged hole and wherein step (f) is carried out by kneading the end of the body portion in the direction towards the opposite surface of the substrate while resisting axial movement of the body portion within the enlarged hole.

9. The method of claim 8 wherein the end of the body portion of insert is kneaded during step (f) by a tool head that moves in a series overlapping orbital paths substantially perpendicular to the longitudinal axis of the body portion.

10. The method of claim 9 wherein the movement during step (f) of the tool head in the series of orbital paths forms a rosette pattern.

11. The method of claim 2 wherein the smaller diameter hole is formed during step (g) through the end portion of the body portion of the fixed insert and wherein axial movement of the fixed insert is resisted during formation of the smaller diameter hole by placing a support against the deformed head portion of the fixed insert.

12. A method for repositioning or repairing a hole in a metal substrate having a first and second surface wherein the hole extends through the substrate from the first surface to the second surface of the substrate, the method comprising the steps of:

(a) enlarging the diameter of the hole to form an enlarged hole having a cylindrical configuration through the substrate from the first to the second surface;

(b) forming in the first surface a first recess at one end of the enlarged hole, the first recess having a wall with a diameter that tapers inwardly in the direction away from the first surface of the substrate and towards one end of the enlarged hole;

(c) forming in the second surface a second recess at the other end of the enlarged hole, the second recess having a wall with a diameter that tapers inwardly in the direction away from the second surface of the substrate and towards the other end of the enlarged hole;

(d) providing a physically deformable metal rivet having a head portion with a frustoconical configuration and a body portion with a cylindrical configuration, the head portion being a capable of frictionally engaging the tapered wall of one of the recesses and having an end with a diameter larger than the diameter of the enlarged hole, the body portion having an end, a diameter sized to permit the body portion to be inserted at least partially within the enlarged hole and a length such that the end of the body portion is capable of extending at least to the other recess;

(e) inserting the rivet through the one recess so that the body portion extends at least partially within the enlarged hole;

(f) after insertion, subjecting the head and body portions of the rivet to physical deforming forces so as to cause the head portion to be deformed and frictionally engage the tapered wall of the one recess, so as to cause the body portion to be deformed and frictionally engage the enlarged hole and so as to cause the end of the body portion to be deformed and frictionally engage the tapered wall of the other recess, so that the rivet becomes substantially axially fixed within the enlarged hole;

(g) forming another hole having a cylindrical configuration and a diameter smaller than that of the enlarged hole in the fixed rivet that extends axially therethrough from the end of the head portion to the end of the body portion.

13. The method of claim 12 wherein the enlarged hole has formed therein a pair of opposed locking portions that extend axially from one end of the enlarged hole to the other end thereof, and wherein the body portion of the rivet within the enlarged holed is deformed during step (f) into and frictionally engages the locking portions so that the body portion is less able to rotate within the enlarged hole.

14. The method of claim 13 wherein the body portion of the rivet has sufficient length such that the end of the body portion extends beyond one end of the enlarged hole and wherein step (f) is carried out by kneading the end of the body portion in the direction towards the opposite surface of the substrate while resisting axial movement of the body portion within the enlarged hole.

15. The method of claim 14 wherein the end of the body portion of the rivet is kneaded during step (f) by a tool head that moves in a series overlapping orbital paths substantially perpendicular to the longitudinal axis of the body portion.

16. The method of claim 15 wherein the movement during step (f) of the tool head in the series of orbital paths forms a rosette pattern.

17. The method of claim 12 wherein the smaller diameter hole is formed during step (g) through the end portion of the body portion of the fixed rivet and wherein axial movement of the fixed rivet is resisted during formation of the smaller diameter hole by placing a support against the deformed head portion of the fixed rivet.

* * * * *